United States Patent
Mori et al.

(10) Patent No.: US 6,267,942 B1
(45) Date of Patent: Jul. 31, 2001

(54) METHOD FOR PRODUCING SPHERICAL SILICA PARTICLES

(75) Inventors: Hiroo Mori; Makoto Kusaka; Hachiro Hirano, all of Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/445,424

(22) PCT Filed: Apr. 8, 1999

(86) PCT No.: PCT/JP99/01856

§ 371 Date: Mar. 16, 2000

§ 102(e) Date: Mar. 16, 2000

(87) PCT Pub. No.: WO99/52822

PCT Pub. Date: Oct. 21, 1999

(30) Foreign Application Priority Data

Apr. 10, 1998 (JP) .................................................. 10-099612

(51) Int. Cl.[7] .................................................. C01B 33/12
(52) U.S. Cl. .................................................. 423/338
(58) Field of Search .................................. 423/338, 335; 502/8

(56) References Cited

U.S. PATENT DOCUMENTS

| | | | |
|---|---|---|---|
| 4,704,374 | * 11/1987 | Jacques | 423/335 |
| 5,582,818 | 12/1996 | Nakanishi et al. . | |
| 5,589,150 | * 12/1996 | Kano et al. | 423/338 |
| 5,738,718 | 4/1998 | Mori et al. . | |
| 5,968,470 | * 10/1999 | Persello | 423/335 |

FOREIGN PATENT DOCUMENTS

| | | | |
|---|---|---|---|
| 1667078-B2 | * 7/1979 | (DE) | 423/338 |
| 396460-A1 | * 11/1990 | (EP) | 423/338 |
| 7-277723 | * 10/1995 | (JP) . | |

* cited by examiner

Primary Examiner—Steven Bos
(74) Attorney, Agent, or Firm—Oblon, Spivak, McClelland, Maier & Neustadt, P.C.

(57) ABSTRACT

It is an object of the present invention to obtain solid spherical silica particles having no depression or crack on the surface. The present invention provides a process for producing spherical silica particles, which comprises dispersing silica gel particles having an average particle size of from 0.05 to 3.0 $\mu$m in a mixed solution of an alkali silicate and an acid, spraying the dispersion to obtain droplets, and heating the droplets in a gas and gelating the mixed solution portion of an alkali silicate and an acid in the droplets.

7 Claims, No Drawings

METHOD FOR PRODUCING SPHERICAL SILICA PARTICLES

BACKGROUND OF THE INVENTION

1. Technical Field

The present invention relates to a process for producing spherical silica particles, particularly a process for producing solid spherical silica particles having no depression or crack on the surface.

2. Background Art

Spherical silica particles are widely used for a catalyst, a catalyst support, a pigment for cosmetics, a column packing for chromatography, a resin filler, an adsorbent or a drying agent, from the viewpoint of varieties in the particle size, the pore structure and the surface physical properties. For such applications, in view of e.g. particle strength or packing density, solid spherical silica particles having no depression or crack on the surface are preferred.

As a process for producing the spherical silica particles, a method has been known wherein an aqueous sodium silicate solution or an alkyl silicate is emulsified in a solvent having no miscibility therewith, followed by gelation with e.g. an acid, an alkali or water (JP-A-4-154605). Further, a method has been known wherein an aqueous sodium silicate solution or an alkyl silicate is gelated with e.g. an acid, an alkali or water, followed by emulsification in a solvent having no miscibility therewith, for granulation (JP-B-4-2525). By such so-called emulsification methods, solid spherical silica particles having no depression can relatively easily be obtained.

Further, as a method for making the shape spherical, a spray method has been widely known. JP-A-61-168520 discloses a method of spray-drying a silica sol. JP-A-4-68247 discloses a method of spray-drying an alkali silicate. By such methods, spherical silica particles having a pore volume of at most about 0.5 $cm^3/g$ can be obtained.

Further, JP-B-6-99135 discloses a method of carrying out wet grinding of a hydrogel, followed by spray drying. By the spray-drying method, hollow particles, depressions and cracks are likely to result, and to overcome these, JP-B-2-61407 proposes a two-stage drying method at a low drying rate and successively at a high drying rate. JP-B-2-61406 and JP-B-5-3412 disclose a spray-drying method by the wet air.

DISCLOSURE OF THE INVENTION

The present invention provides a process for producing spherical silica particles, which comprises dispersing silica gel particles having an average particle size of from 0.05 to 3.0 μm in a mixed solution of an alkali silicate and an acid, spraying the dispersion to obtain droplets, and heating the droplets in a gas and gelating the mixed solution portion of an alkali silicate and an acid in the droplets.

BEST MODE FOR CARRYING OUT THE INVENTION

The silica gel particles to be dispersed in a mixed solution of an alkali silicate and an acid are required to have an average particle size of from 0.05 to 3.0 μm. In a case where the average particle size of the silica gel particles is smaller than 0.05 μm, mechanical strength of the spherical silica particles to be obtained will be low, and irregular particles are likely to form, such being unsuitable. Similarly, in a case where the average particle size of the silica gel particles is larger than 3.0 μm, mechanical strength of the spherical silica particles to be obtained will be low, and irregular particles are likely to form, such being unsuitable. The more preferred range of the average particle size of the silica gel particles is from 0.1 to 1.0 μm.

In the production process of the present invention, with respect to the mixed solution of an alkali silicate and an acid, the alkali silicate will hydrolyze by heating, and polymerization of silicic acid as a hydrolysis product will proceed, for gelation. With respect to the spherical silica particles to be obtained by the production process of the present invention, the gel produced from the mixed solution of an alkali silicate and an acid, will be the matrix which bonds the silica gel particles in the dispersion. In the present specification, the dispersion having the silica gel particles dispersed in the mixed solution of an alkali silicate and an acid will be referred to as a composite dispersion.

In a case of obtaining droplets of an dispersion having the silica gel particles alone followed by drying, without using the mixed solution of an alkali silicate and an acid, or in a case of using a silica sol instead of the mixed solution of an alkali silicate and an acid, mixing the silica gel particles thereto to obtain droplets followed by drying, spherical silica gel particles can be obtained. By such methods, gelation is caused mainly by evaporation of the solvent, and accordingly, along with evaporation of the solvent, the silica gel particles in the dispersion will move towards the surface of the droplets, whereby the spherical silica particles are likely to have hollows, and depressions and cracks are likely to form, unless the conditions are well controlled.

On the other hand, in the present invention, gelation takes place by hydrolysis of the alkali silicate and polymerization of silicic acid. Although the solvent may evaporate in this stage, as the chemical reaction is accelerated mainly by heating for gelation, the volume will not significantly change, the spherical silica particles are less likely to have hollows, and formation of depressions and cracks will be suppressed. Accordingly, it is preferred to employ such a condition that the gelation rate by heating is relatively higher than the evaporation rate of the solvent. Namely, it is important to adjust the relative rate of the gelation rate by heating to the evaporation rate of the solvent. The evaporation rate of the solvent from the droplets will be high when the heating temperature becomes high, and will be low when the solvent vapor pressure surrounding the droplets becomes high.

As the temperature for heating the droplets of the composite dispersion in a gas, the temperature of the gas which is in contact with the spherical particles when the gelation has substantially completed, is preferably from 60 to 200° C. The time when the gelation has substantially completed, is the time when fluidity of the mixed solution of an alkali silicate and an acid in the composite dispersion has disappeared. The gas temperature lower than 60° C. is unfavorable since gelation by heating may be inadequate, and the strength of the spherical particles to be produced may be weak. The gas temperature higher than 200° C. is unfavorable from reasons such that utilization efficiency of energy will decrease.

In the production process of the present invention, if the solvent rapidly evaporates during the gelation of the droplets, there is a fear that the shape of the silica particles to be obtained may not be spherical. Accordingly, in a case where the solvent is water, it is preferred to increase the water vapor pressure in the gas during heating in the gas. The relative humidity of the gas which is in contact with the spherical particles is preferably at least 20% when the gelation has substantially completed. The relative humidity at this point is more preferably at least 30%. From the viewpoint of physical properties of the spherical silica particles, there is no upper limit of the relative humidity. However, if the humidity is high, there is a possibility of problems arising, such as undesirable dropwise condensation in a production apparatus. Accordingly, the relative humidity of the gas which is in contact with the spherical particles when the gelation has substantially completed, is preferably at most 80%.

Further, in order to control evaporation of the solvent from the droplets of the composite dispersion, a substance which decrease the vapor pressure of the solvent, may be contained in the dispersion. In the case where the solvent is water, it is preferred to increase the concentration of coexisting salts of the water, or to mix an organic substance having a boiling point lower than the water. In such cases, by changing the concentration of coexisting salts or the addition amount of the organic substance having a boiling point lower than the water, evaporation rate of moisture from the droplets can be adjusted.

It is particularly preferred to dissolve in the water as the solvent, an organic substance having a boiling point lower than the water in an amount of at least 5 wt % based on the water. If the content of the organic substance is less than 5 wt %, no adequate effect for decreasing the vapor pressure will be obtainable. Further, it is preferred that the organic substance is completely dissolved in the water at the concentration with which it is used. Specifically, methanol, ethanol, 1-propanol, 2-propanol or acetone may, for example, be suitable used.

As the silica gel particles to be dispersed in the composite dispersion, silica gel obtained by reaction of an alkali silicate such as sodium silicate with an acid such as sulfuric acid, or silica gel obtained by hydrolysis of an alkyl silicate or a polyalkyl silicate, may, for example, be used. Silica gel synthesized by a vapor phase method, or silicic hydrate called white carbon, may also be used. The silica gel particles are hydrogel in the composite dispersion, and silica xerogel may be dispersed therein.

By adjusting e.g. pH, the amount of coexisting ions and temperature in the stage of synthesis of the silica gel, silica gel particles having an average particle size of from 0.05 to 3.0 $\mu$m can be produced. Further, silica gel having larger particle sizes may be treated by e.g. a wet grinding method employing e.g. a medium agitation mill, a colloid mill or a wet ball mill, or a dry grinding method by employing e.g. a get mill or a dry ball mill, to adjust the particle size. It is particularly preferred to use a medium agitation mill, from the viewpoint that particles having the above-mentioned particle size range will readily be obtained, and the degree of contamination of impurities will be low. The composite dispersion may be made, and then the silica gel particles in the composite dispersion may be adjusted to have a desired particle size by means of the above-mentioned grinding method.

As the alkali silicate, a sodium silicate is preferred, and sodium silicates comprising silicic acid and sodium with various molar ratios can be available depending upon the desired properties. The acid to be mixed with the alkali silicate is not particularly limited, and it is preferred to use sulfuric acid.

To prepare the composite dispersion, the mixed solution of the alkali silicate and the acid may be prepared, and then the silica gel particles may be dispersed therein, or the silica gel particles may be dispersed in either of the solution of the alkali silicate or the solution of the acid, and then the other mixed solution component may be mixed therewith. The mixing ratio is preferably such that when each of the silicic acid component and the silica gel particles in the mixed solution is calculated as $SiO_2$, the silicic acid component in the mixed solution as $SiO_2$ is from 5 to 50 wt % based on the total amount of the silicic acid component and the silica gel particles in the mixed solution. The silicic acid component in the mixed solution is more preferably within a range of from 10 to 30 wt %.

With respect to the mixed solution of the alkali silicate and the acid, by changing the concentration, pH or the concentration of coexisting salts, gelation rate by heating can be adjusted. In general, the higher the concentration, the higher the gelation rate. Further, within a pH range of from 0 to 6, the gelation ratio at a temperature in the vicinity of room temperature may not be high, and at the other pH range, the gelation rate will be high. The higher the concentration of coexisting salts, the higher the gelation rate. Under such conditions, the higher the temperature, the higher the gelation ratio.

As a method to obtain the droplets of the composite dispersion, a known spraying apparatus of e.g. rotating disc type, two fluid nozzle type, pressure nozzle type, two fluid pressure nozzle type or electrostatic type, may be used. The droplet size is selected depending upon the desired particle size of the spherical silica particles and the solid content concentration of the composite dispersion, and it is preferably from 1 to 200 $\mu$m.

As a means of heating the droplets, a method by hot wind, a method of making the droplets pass through a heated tube, infrared heating or dielectric heating may, for example, be mentioned.

As the spherical silica particles obtained in the present invention contain a salt formed by reaction of the alkali silicate and the acid, it is preferred to remove the salt by washing. After the washing, drying is carried out, and as the case requires, e.g. a calcination treatment may be carried out. With the purpose of controlling the pore characteristics, an aging treatment may be carried out at an appropriate stage in the production process.

By the production process of the present invention, spherical silica particles having an average particle size of preferably from 1 to 100 $\mu$m can be obtained. The pore characteristics of the spherical silica particles can be controlled by the concentration of the mixed solution or the silica gel particles to be used, and preferably, silica gel having a pore volume of from 0.01 to 3.0 $cm^3/g$ and a specific surface area of from 1 to 1,000 $m^2/g$, can be produced.

The spherical silica particles obtained by the production process of the present invention has a uniform particle size and a shape close to a sphere. Accordingly, they can be preferably used, for example, for a column packing for liquid chromatography.

EXAMPLES

Example 1

Silica gel having an average particle size of 5 $\mu$m, a pore volume of 0.55 $cm^3/g$ and a specific surface area of 750 $m^2/g$ was dispersed in water to have a solid content of 40 wt %, followed by wet grinding by means of a medium agitation mill having zirconia beads of 0.5 mm packed therein, to obtain a dispersion containing silica gel having an average particle size of 0.4 $\mu$m.

To 10 kg of the dispersion, 940 g of a 25 wt % sulfuric acid solution was added. Then, 1.71 kg of a sodium silicate solution having a $SiO_2$ concentration of 23.36% and a $Na_2O$ concentration of 7.83% was diluted with 600 g of desalinated water, and gradually added to the above-mentioned dispersion having sulfuric acid added thereto with vigorously stirring, to obtain a composite dispersion. The composite dispersion had a pH of 2.4.

The composite dispersion was sprayed into a hot wind of 180° C. by a two fluid nozzle, followed by heating, and when the gelation had substantially completed, the resulting spherical silica particles were recovered. When the gelation has significantly completed, the hot wind had a temperature of 80° C. and a relative humidity of 30%. The obtained spherical silica particles had an average particle size of 12 μm, and were solid, and no presence of depressions or cracks was confirmed.

The average particle sizes of the silica particles in the dispersion and the silica particles after spray-heat treatment, were measured by Microtrack UPA and Microtrack HRA (X100), respectively, manufactured by NIKKISO CO., LTD. The shape of the particles was observed by a scanning electron microscope and an optical microscope, and evaluation was carried out.

Example 2

A composite dispersion was obtained in the same manner as in Example 1, except that conditions for wet grinding by a medium agitation mill were changed, and the average particle size after grinding was 1.6 μm. Droplets of the composite dispersion were obtained under the same conditions as in Example 1, followed by heating, to obtain spherical silica particles. When the gelation had substantially completed, the hot wind has a temperature of 80° C. and a relative humidity of 30%. The obtained spherical silica particles had an average particle size of 12 μm, and were solid, and no presence of depressions or cracks was confirmed.

Example 3 (Comparative Example)

A composite dispersion was obtained in the same manner as in Example 1, except that no grinding by a medium agitation mill was carried out, and the silica gel having an average particle size of 5 μm was directly used. Droplets of the composite dispersion were obtained under the same conditions as in Example 1, followed by heating. The obtained silica particles were not spherical, but were irregular. When the gelation had substantially completed, the hot wind had a temperature of 80° C. and a relative humidity of 30%.

Example 4 (Comparative Example)

In the same manner as in Example 1, silica gel having an average particle size of 5 μm, a pore volume of 0.55 cm$^3$/g and a specific surface area of 750 m$^2$/g was dispersed in water to have a solid content of 40 wt %, followed by wet grinding by means of a medium agitation mill having zirconia beads of 0.5 mm packed therein, to obtain a dispersion containing silica gel having an average particle size of 0.4 μm.

The dispersion was directly sprayed into a hot wind of 180° C. by a two fluid nozzle, followed by heating, and the resulting silica particles were recovered. When the gelation had substantially completed, the hot wind had a temperature of 80° C. and a relative humidity of 30%. The obtained silica particles were spherical, and had an average particle size of 14 μm. However, most silica particles had hollows, and depressions on the surfaces. No presence of cracks was confirmed.

Examples 5 to 8

Droplets of the composite dispersion obtained in Example 1 were obtained in the same manner under various heating conditions, to evaluate the influences. The heating conditions are represented by exhaust gas temperature (temperature of the gas when the gelation had substantially completed) and exhaust gas humidity (relative humidity of the gas when the gelation had substantially completed) in Table 1. Table 1 also shows conditions in Example 1 in the leftmost column.

In Table 1, with respect to defects in shape of the obtained spherical silica particles, the ratio of particles having hollows, the ratio of particles having depressions, and the ratio of particles having cracks, evaluated by observation by a microscope, were shown in columns "hollows", "depressions" and "cracks", respectively. In these columns, "A" represents that substantially no defect was confirmed, "B" represents that such defects were confirmed in 10–30% of particles, "C" represents that such defects were confirmed in about half of the particles, and "D" represents such defects were confirmed in most of the particles. Ones as rated to a level of C, may be used by carrying out classification operation, depending upon the application.

TABLE 1

| Examples | 1 | 5 | 6 | 7 | 8 |
|---|---|---|---|---|---|
| Exhaust gas temperature (° C.) | 80 | 110 | 140 | 80 | 110 |
| Exhaust gas humidity (%) | 30 | 40 | 30 | 3 | 2 |
| Spherical particle size (μm) | 12 | 12 | 12 | 14 | 15 |
| Hollows | A | A | A | B | C |
| Depressions | A | A | A | C | C |
| Cracks | A | A | A | A | C |

Although spherical silica gel particles were obtained under every conditions, in Examples 7 and 8, characteristics were inferior to the other one since particles having hollows and depressions were contained in a small amount.

Examples 9 to 12

Sodium silicate was reacted with sulfuric acid, followed by washing to obtain a silica hydrogel dispersion. The dispersion was dried at 120° C., whereupon silica xerogel having a pore volume of 0.45 cm$^3$/g and a specific surface area of 745 m$^2$/g was obtained. The silica hydrogel dispersion was subjected to wet grinding by a sand mill, to obtain a silica dispersion having an average particle size of 0.3 μm. The solid content concentration was 12 wt %.

To 6.5 kg of the silica dispersion, 182 g of 25% sulfuric acid was added, and 334 g of sodium silicate having a $SiO_2$ concentration of 23.36% and a $Na_2O$ concentration of 7.83% was gradually added with vigorously stirring, to obtain a composite dispersion.

The composite dispersion was sprayed into a hot wind of 250° C. by a rotating disk spray type, followed by heating, to obtain particulate silica particles. Heating conditions and the shape of the obtained particles are shown in Table 2. Items in Table 2 are as defined for Table 1.

TABLE 2

| Examples | 9 | 10 | 11 | 12 |
|---|---|---|---|---|
| Exhaust gas temperature (° C.) | 80 | 80 | 110 | 200 |
| Exhaust gas humidity (%) | 3 | 50 | 40 | 50 |
| Spherical particle size ($\mu$m) | 52 | 41 | 41 | 37 |
| Hollows | C | A | A | A |
| Depressions | C | A | A | A |
| Cracks | B | A | A | A |

Example 13

To 1 kg of the composite dispersion used in Example 1, 200 g of 2-propanol was added. The ratio of 2-propanol was 25 wt % based on the total amount of solvents i.e. the total of water and 2-propanol, and 2-propanol was completely dissolved. Treatment was carried out under the same conditions as in Example 1, whereupon spherical silica having no hollow, depression nor crack was obtained.

Examples 14 to 18

Each of spherical silica particles obtained in Examples 1, 5, 9, 10 and 12, were dispersed in water again, adjusted to have pH 8 by aqueous ammonia, and kept at 60° C. for 1 hour for aging. Adjustment was carried out by sulfuric acid to have pH 3, washing by desalinated water was carried out, and drying at 120° C. for 2 hours was carried out.

The compressive strengths of these spherical silica particles were measured by a microcompression testing machine MCTM-500 manufactured by Shimadzu Corp. Measurements were carried out by selecting particles having particle sizes as shown in Table 3.

TABLE 3

| Examples | 14 | 15 | 16 | 17 | 18 |
|---|---|---|---|---|---|
| Spherical silica particles | Example 1 | Example 5 | Example 9 | Example 10 | Example 12 |
| Measured particle size ($\mu$m) | 15 | 15 | 50 | 50 | 50 |
| Compressive strength (kgf/mm$^2$) | 7.2 | 9.6 | 0.8 | 3.2 | 3.8 |

Example 19

With respect to the spherical silica particles obtained in Example 18, particles having particle sizes within a range of from 40 to 63 $\mu$m alone were separated by using a sieve. The spherical silica particles were packed in a column having an inner diameter of 50 mm and an effective length of 200 mm, to prepare a column for liquid chromatography. A developer (normal hexane: 90 vol %, dioxane: 10 vol %) was made to flow through the column at a flow rate of 50 cm$^3$/min, and liquid chromatographs of anisole and orthonitroanisole were measured (detection wavelength: 254 nm). The number of theoretical plates was 5,350 plates.

When silica gel having crushed shape with particle sizes of from 40 to 63 $\mu$m (LiChroprep Si60, trade name, manufactured by Kanto Chemical Co., Inc.) was used to carry out measurements under the same conditions, the number of theoretical plates was 3,200 plates. It was confirmed that performances of the liquid chromatography had improved by making the shape spherical.

INDUSTRIAL APPLICABILTY

According to the present invention, solid spherical silica particles having no depression or crack on the surface, can effectively be produced. By adjusting physical properties of silica gel particles to be used, physical properties of the spherical silica particles can optionally be adjusted. With respect to the spherical silica particles to be obtained, mechanical strength of the particles is high, and pore characteristics can readily be adjusted. Accordingly, the spherical silica particles can be preferably used for a catalyst, a catalyst support, a pigment for cosmetics, a column packing for chromatography, a resin filler, an adsorbent or a drying agent.

What is claimed is:

1. A process for producing spherical silica particles, which comprises dispersing silica gel particles having an average particle size of from 0.05 to 3.0 $\mu$m in a mixed solution of an alkali silicate and an acid, spraying the dispersion to obtain droplets, and heating the droplets in a gas and gelating the mixed solution portion of an alkali silicate and an acid in the droplets.

2. The process for producing spherical silica particles according to claim 1, wherein the solvent for the mixed solution is water, and the gas which is in contact with the spherical particles when the gelation has substantially completed, has a temperature of from 60 to 200° C. and a relative humidity of at least 20%.

3. The process for producing spherical silica particles according to claim 1 or 2, wherein the solvent for the mixed solution is water, and in the water, an organic substance having a boiling point lower than the water is dissolved in an amount of at least 5 wt % based on the water.

4. The process for producing spherical silica particles according to claim 3, wherein the organic substance having a boiling point lower than the water is selected from the group consisting of methanol, ethanol, 1-propanol, 2-propanol and acetone.

5. The process for producing spherical silica particles according to claim 1, wherein the sizes of the droplets of the dispersion are from 1 to 200 $\mu$m.

6. The process for producing spherical silica particles according to claim 1, wherein the average particle size of the spherical silica particles is from 1 to 100 $\mu$m.

7. The process for producing spherical silica particles according to claim 1, wherein the pore volume of the spherical silica particles is from 0.01 to 3.0 cm$^3$/g, and the specific surface area is from 1 to 1000 m$^2$/g.

* * * * *